(12) United States Patent  (10) Patent No.: US 7,935,394 B2
Lim et al.  (45) Date of Patent: May 3, 2011

(54) POLAR NEMATIC LIQUID CRYSTAL ASSEMBLY AND LIQUID CRYSTAL DEVICE USING THE SAME

(75) Inventors: Tong-Kun Lim, Seoul (KR); Ji-Hoon Lee, Jinju-Si (KR)

(73) Assignee: Korea University Industry and Academy Cooperation Foundation, Seoul (KR)

( * ) Notice: Subject to any disclaimer, the term of this patent is extended or adjusted under 35 U.S.C. 154(b) by 922 days.

(21) Appl. No.: 11/885,060

(22) PCT Filed: Nov. 9, 2005

(86) PCT No.: PCT/KR2005/003793
§ 371 (c)(1),
(2), (4) Date: Aug. 23, 2007

(87) PCT Pub. No.: WO2007/037575
PCT Pub. Date: Apr. 5, 2007

(65) Prior Publication Data
US 2008/0273161 A1    Nov. 6, 2008

(30) Foreign Application Priority Data

Sep. 29, 2005  (KR) .................. 10-2005-0090984

(51) Int. Cl.
*C09K 19/52* (2006.01)
*C09K 19/54* (2006.01)
*G02F 1/133* (2006.01)
(52) U.S. Cl. ................. 428/1.1; 252/299.01; 252/299.5; 349/184; 349/185
(58) Field of Classification Search ................... 428/1.1; 252/299.01, 299.5; 349/184, 185
See application file for complete search history.

(56) References Cited

U.S. PATENT DOCUMENTS
2005/0146670 A1  7/2005  Helgee et al.

FOREIGN PATENT DOCUMENTS
EP    1 191 082 A1    3/2002
KR    10-294490 B1    7/2001
WO    WO 2004/003108  1/2004

OTHER PUBLICATIONS

International Search Report, dated Jun. 20, 2006, corresponding to PCT/KR2005/003793. Written Opinion, dated Jun. 20, 2006, corresponding to PCT/KR2005/003793.
Korean Patent Abstracts, Publication No. 100294490 B1, Published on Apr. 17, 2001, in the name of Kang, et al.

*Primary Examiner* — Shean C Wu
(74) *Attorney, Agent, or Firm* — Christie, Parker & Hale, LLP (57) ABSTRACT

Disclosed herein is a polar nematic liquid crystal assembly. The liquid crystal assembly comprises 5~7.5% by weight of a dopant having the structure of Formula 1 below:

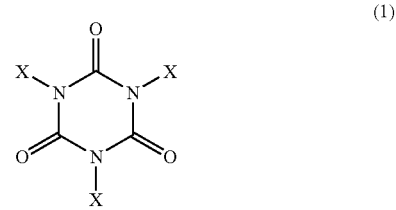

(1)

(wherein X is an alkyl, alkenyl or heteroalkyl group having three or more carbon atoms) and 92.5~95% by weight of smectic liquid crystal molecules having a linear alkyl chain wherein the N-bonding moiety of the dopant is spontaneously bonded to the alkyl chain of the smectic liquid crystal molecules to induce macroscopic spontaneous polarization in a particular direction.

10 Claims, 10 Drawing Sheets
(8 of 10 Drawing Sheet(s) Filed in Color)

POLAR NEMATIC LIQUID CRYSTAL ASSEMBLY AND LIQUID CRYSTAL DEVICE USING THE SAME

CROSS-REFERENCE TO A RELATED APPLICATION

This application is a National Phase Patent Application of International Patent Application Number PCT/KR2005/003793, filed on Nov. 9, 2005, which claims priority of Korean Application Number 10-2005-0090984, filed on Sep. 29, 2005.

TECHNICAL FIELD

The present invention relates to a polar nematic liquid crystal assembly. More specifically, the present invention relates to a polar nematic liquid crystal assembly as a polar device whose molecular alignment state varies depending on the direction of an applied electric field in which the assembly exhibits a nematic phase in the ordering of liquid crystal molecules, and a liquid crystal device using the assembly.

BACKGROUND ART

At present, liquid crystal devices (LCDs) are commercially available as flat panel displays. Such liquid crystal devices employ paraelectric liquid crystal materials in a nematic phase with no macroscopic spontaneous polarization. Since nematic liquid crystals have potent fluid characteristics, they are highly stable against impact but have a response speed as low as about 10 msec. For these reasons, nematic liquid crystals do not rapidly respond to changes in electric field and the alignment of liquid crystal molecules becomes stable after a certain time, causing the problems of afterimages and image trails. Many proposals have been made on liquid crystal materials and driving modes capable of solving the problem of afterimages.

For example, since the 1980's, a number of studies have been devoted to ferroelectric liquid crystal devices which align chiral liquid crystal molecules in a particular direction using a surface alignment agent to induce macroscopic spontaneous polarization. Macroscopic spontaneous polarization induced in ferroelectric liquid crystals linearly interacts with an applied electric field, thereby advantageously enabling the ferroelectric liquid crystals to have a response speed of almost 1,000 times higher than that of nematic liquid crystals even at low voltages. Ferroelectric liquid crystals, however, have the disadvantage of poor impact resistance due to their high crystallinity.

Accordingly, liquid crystal devices having both the advantage of ferroelectric liquid crystals, i.e. high polarity, and the advantage of nematic liquid crystals, i.e. superior stability against impact, will contribute to solving the technical problems encountered with currently available LCDs. In this connection, since the late 1990's, the possibility of the existence of polar nematic liquid crystals having macroscopic spontaneous polarization and no positional ordering has been theoretically anticipated in the art [L. M. Blinov, Liquid Crystals, 24 (1998) 143]. Until now, however, no experimental results proving the existence of polar nematic liquid crystals have been reported by any research group throughout the world.

On the other hand, fabrication of conventional LCDs essentially involves treatment of substrates with aligners to uniformly align liquid crystal molecules. Materials for the aligners as well as equipment, time and cost required for additional surface coating, baking and rubbing cause an increase in fabrication costs and a reduction in fabrication yield. In addition, deterioration in quality, such as color purity and transmittance, due to inherent colors of aligners is caused and is thus a major obstacle in the fabrication of LCDs. Under these circumstances, there has been much research aimed to solve the above problems.

As a representative example, research has been conducted on photo-alignment using photoisomerizing materials since the 1990's. However, since there is no photoisomerizing material having sufficient surface anchoring force, photo-alignment still suffers from difficulty in practical use. Apart from the photo-alignment, techniques using inherent alignment characteristics on a specially-treated surface or self-assembly of basic units, such as ionic bonds, have recently drawn a great deal of attention. Since these techniques are disadvantageous over conventional techniques using aligners, in terms of high fabrication costs and poor basic characteristics, e.g., transmittance, only fundamental studies on the possibility of practical application are currently being conducted.

DISCLOSURE OF THE INVENTION

Therefore, it is a first object of the present invention to provide a polar nematic liquid crystal assembly having a much higher response speed than conventional nematic liquid crystal molecules and superior stability against impact to ferroelectric liquid crystal molecules.

It is a second object of the present invention to provide a liquid crystal device having a high response speed and superior stability against impact wherein the liquid crystal device is fabricated using the polar nematic liquid crystal assembly without additional treatment with an aligner.

In accordance with one aspect of the present invention for achieving the first object, there is provided a polar nematic liquid crystal assembly comprising 5~7.5% by weight of a dopant having the structure of Formula 1 below:

Formula 1

(wherein X is an alkyl, alkenyl or heteroalkyl group having three or more carbon atoms) and 92.5~95% by weight of smectic liquid crystal molecules having a linear alkyl chain wherein the N-bonding moiety of the dopant is spontaneously bonded to the alkyl chain of the smectic liquid crystal molecules to induce macroscopic spontaneous polarization in a particular direction.

In accordance with another aspect of the present invention for achieving the second object, there is provided a polar nematic liquid crystal device comprising the liquid crystal assembly, electrodes for applying a voltage to the liquid crystal assembly, and a pair of substrates facing each other.

BRIEF DESCRIPTION OF THE DRAWINGS

The patent or application file contains at least one drawing executed in color. Copies of this patent or patent application publication with color drawing(s) will be provided by the Office upon request and payment of the necessary fee The above and other objects, features and other advantages of the present invention will be more clearly understood from the following detailed description taken in conjunction with the accompanying drawings, in which.

BEST MODE FOR CARRYING OUT THE INVENTION

Hereinafter, the present invention will be explained in more detail.

A liquid crystal assembly of the present invention comprises 5~7.5% by weight of a dopant having the structure of Formula 1 below:

(1)

(wherein X is an alkyl, alkenyl or heteroalkyl group having three or more carbon atoms) and 92~95% by weight of smectic liquid crystal molecules having a linear alkyl chain wherein the N-bonding moiety of the dopant is spontaneously bonded to the alkyl chain of the smectic liquid crystal molecules to induce macroscopic spontaneous polarization in a particular direction. Since the liquid crystal assembly exhibits polarity due to the presence permanent dipoles formed by the induced macroscopic spontaneous polarization, the dipoles are macroscopically directed in a particular direction when an electric field is applied thereto. Since the polar nematic liquid crystal assembly can be operated at the same speed in both directions depending on the direction of an electric field, it has a high response speed and exhibits a nematic phase in the ordering of the molecules, resulting in superior stability against impact. Therefore, the polar nematic liquid crystal assembly can be applied to flexible displays using plastic substrates.

When the content of the dopant is less than 5% by weight, the nematic liquid crystal assembly does not exhibit sufficient polarity, resulting in a low response speed. Meanwhile, when the content of the dopant exceeds 7.5% by weight, the content of the liquid crystal molecules is relatively small and thus there may be a risk of low contrast ratio.

Figure 1:
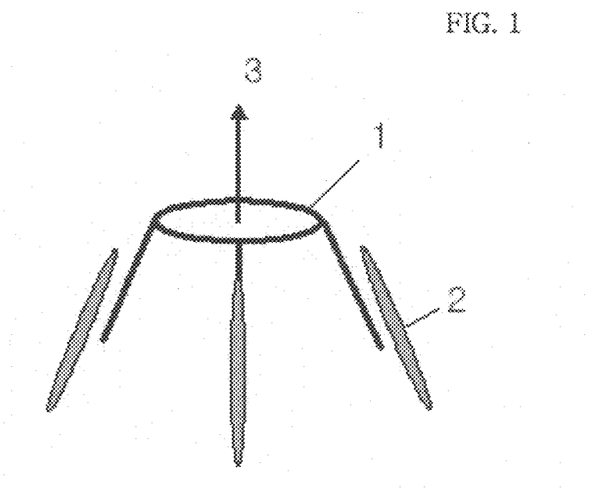
FIG. 1 is a schematic view showing the structure of a polar nematic liquid crystal assembly according to the present invention.

The structure of the polar nematic liquid crystal assembly according to the present invention is schematically shown in FIG. 1. With reference to FIG. 1, two or more constituent materials of the polar nematic liquid crystal assembly cause spontaneous bonding due to the interaction therebetween, resulting in the formation of permanent dipoles. The compound of Formula 1 used in the dopant in the present invention has a tripod shape. It is estimated that the smectic liquid crystal molecules are spontaneously bonded in parallel to the legs of the tripod due to intermolecular interaction. The number of carbon atoms (X) in the compound of Formula 1 used as the dopant in the present invention is preferably not less than 3. When one or two carbon atoms are present in X, the dopant is not sufficiently long to cause spontaneous bonding with the smectic liquid crystal molecules.

Preferred dopants that can be used in the present invention include 1,3,5-triallyl-[1,3,5]triazinane-2,4,6-trione of Formula 2 and 1,3,5-tris-oxiraylmethyl-[1,3,5]triazinane-2,4,6-trione of Formula 3 below:

Formula 2

Formula 3

The smectic liquid crystal molecules with a linear alkyl chain used in the present invention have a linear molecular structure, and are not specially restricted so long as an electron withdrawing group is bonded to one terminal position of the liquid crystal molecules. The alkyl chain of the smectic liquid crystal molecules preferably has eight or more carbon atoms. Spontaneous bonding is caused due to the interaction between the N-bonding moiety (X) of the dopant and the alkyl chain of the smectic liquid crystal molecules only when the number of carbon atoms in the alkyl chain is eight or more. In the present invention, spontaneous bonding caused due to the interaction between the N-bonding moiety (X) of the dopant and the alkyl chain of the smectic liquid crystal molecules is not specially restricted. Considering the fact that the spontaneous bonding is caused only when the moiety and the alkyl chain have predetermined lengths, it is contemplated that the spontaneous bonding arises form intermolecular dispersion force and steric effects.

When dipoles are defined as being directed from negative toward positive charges, the permanent dipoles are directed from the liquid crystal molecules toward the center of the dopant in the polar nematic liquid crystal assembly of the present invention, as shown in FIG. 1, thus maintaining a constant direction with the optic axis of the polar nematic liquid crystal assembly of the present invention.

Examples of suitable smectic liquid crystal molecules that can be used in the present invention include 4'-octyl-biphenyl-4-carbonitrile, 4'-nonyl-biphenyl-4-carbonitrile, 4'-decyl-biphenyl-4-carbonitrile, 4'-undecyl-biphenyl-4-carbonitrile, 4'-dodecyl-biphenyl-4-carbonitrile, 4'-octyloxy-biphenyl-4-carbonitrile, 4'-nonyloxy-biphenyl-4-carbonitrile, 4'-decyloxy-biphenyl-4-carbonitrile, 4'-undecyloxy-biphenyl-4-carbonitrile, 4'-dodecyloxy-biphenyl-4-carbonitrile, and mixtures thereof.

The liquid crystal assembly of the present invention has cholesteric properties in a state where no electric field is applied thereto. General cholesteric liquid crystal molecules have a very slow response time, whereas the liquid crystal assembly of the present invention advantageously has a fast response time of 4 ms or less. Since the liquid crystal assembly of the present invention selectively reflects light according to the wavelength of the light, like general cholesteric liquid crystal molecules, it can be used in the fabrication of color liquid crystal displays even without the use of color filters.

The dopant and the smectic liquid crystal molecules used in the nematic liquid crystal assembly of the present invention have an achiral structure, but the nematic liquid crystal assembly formed by the spontaneous bonding between the dopant and the smectic liquid crystal molecules has a chiral structure. Chirality is induced because the nematic liquid crystal assembly has cholesteric properties. Specifically, the chirality is induced due to the helical structure of the nematic liquid crystal assembly.

A polar nematic liquid crystal device of the present invention is fabricated using the polar nematic liquid crystal assembly. The direction of the optic axis of the assembly can be controlled with respect to incident light by controlling the direction of the dipoles using an applied electric field to vary the difference in phase retardation between polarizers arranged vertically to each other. As a result, the amount of light transmitted through the device can be adjusted. Further, since the direction of the dipoles can be controlled by varying the intensity of the electric field, the polar nematic liquid crystal device of the present invention has the advantage that analogue grayscale can be realized.

On the other hand, in the case where conductive materials, such as ITO substrates, are used, the polar nematic liquid crystal assembly is aligned in a direction perpendicular to the interface due to the presence of spontaneous permanent dipoles in the polar nematic liquid crystal device, thus attaining a uniform alignment state. Accordingly, the liquid crystal device of the present invention can be fabricated without additional treatment with an aligner, which contributes to marked reduction in fabrication costs and increase in fabrication yield, and solves the problem of deteriorated color purity caused by an aligner.

Figure 2:
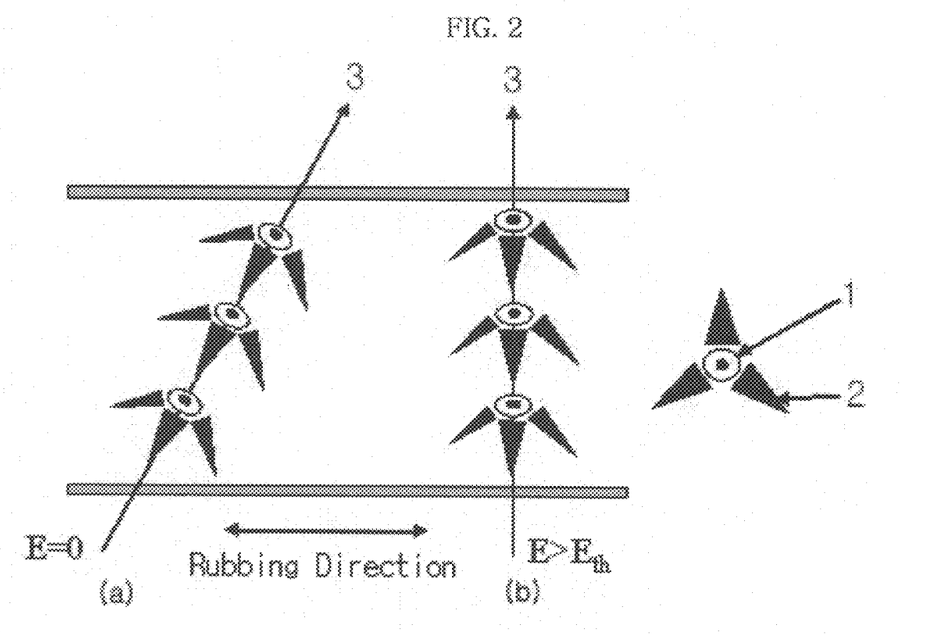
FIGS. 2a and 2b schematically show the alignment states of polar nematic liquid crystal molecules used in one embodiment of the present invention when an electric field is removed and applied, respectively.

Alternatively, the polar nematic liquid crystal device of the present invention can be fabricated using an aligner. The liquid crystal device fabricated using an aligner is schematically shown in FIGS. 2a and 2b. As shown in FIG. 2a, the dipoles and optic axis of the liquid crystal assembly are inclined to the rubbing direction of the aligner, allowing the nematic liquid crystal device to have anisotropy with respect to light perpendicularly incident on the substrates. As a result, in a state where no electric field is applied, the incident light is transmitted (normally white) between vertical polarizers. Referring to FIG. 2b, the direction of the dipoles and optic axis are aligned in proportion to the intensity of an applied electric field. During the alignment, anisotropy with respect to the light is changed, leading to a change in transmittance. That is, analogue grayscale can be realized.

It is preferred that the polar nematic liquid crystal device of the present invention be of an in-plane switching (IPS) type in the case where no aligner is used. If electrodes are formed at both substrates without using an aligner, there is no difference in optical anisotropy between the states where an electric field is applied and not applied, making it difficult to fabricate the desired device. Accordingly, patterned electrodes are formed on the surface of one of a pair of substrates facing each other in the fabrication of an IPS type device. In doing so, the optic axis of the liquid crystal assembly is aligned in a direction perpendicular to the glass substrates upon removal of an electric field, and aligned in a direction parallel to the glass substrates upon application of an electric field, thereby enabling fabrication of a liquid crystal device using this difference in optical anisotropy.

On the other hand, since the polar nematic liquid crystal device of the present invention has superior stability against impact, it can be applied to flexible liquid crystal devices using plastic substrates.

The present invention will now be described in more detail with reference to the following preferred examples. However, these examples are not to be construed as limiting the scope of the invention.

Example 1

Upper and lower glass substrates on which transparent electrodes (ITO electrodes) were deposited were coated with an aligner (polyimide solution), heat-cured, and laminated to each other so that the rubbing direction of the upper glass substrate was opposite to that of the lower glass substrate. The interval between the substrates was adjusted to 5.32 μm using a ceramic spacer. Next, 5% by weight of 1,3,5-triallyl-[1,3,5]triazinane-2,4,6-trione (Aldrich) as a dopant and 95% by weight of 4'-octyl-biphenyl-4-carbonitrile (Aldrich) as smectic liquid crystal molecules were injected between the substrates at 70° C. to fabricate a liquid crystal device.

Example 2

A liquid crystal device was fabricated in the same manner as in Example 1, except that 6.5% by weight of the dopant was used and 93.5% by weight of 4'-octyl-biphenyl-4-carbonitrile (Aldrich) were used as smectic liquid crystal molecules.

Example 3

A liquid crystal device was fabricated in the same manner as in Example 1, except that 7.5% by weight of the dopant was used and 92.5% by weight of 4'-octyl-biphenyl-4-carbonitrile (Aldrich) was used as smectic liquid crystal molecules.

Example 4

Upper and lower glass substrates on which transparent electrodes (ITO electrodes) were deposited were coated with an aligner (polyimide solution), heat-cured, and laminated to each other so that the rubbing direction of the upper glass substrate was opposite to that of the lower glass substrate. The interval between the substrates was adjusted to 5.32 μm using a ceramic spacer. Next, 5% by weight of 1,3,5-tris-oxyranyl-methyl-[1,3,5]-triazinane-2,4,6-trione (Aldrich) as a dopant and 95% by weight of 4'-octyl-biphenyl-4-carbonitrile (Aldrich) as smectic liquid crystal molecules were injected between the substrates at 70° C. to fabricate a liquid crystal device.

Example 5

Upper and lower glass substrates on which transparent electrodes (ITO electrodes) were deposited were coated with an aligner (polyimide solution), heat-cured, and laminated to each other so that the rubbing direction of the upper glass substrate was opposite to that of the lower glass substrate. The interval between the substrates was adjusted to 5.32 μm using a ceramic spacer. Next, 6% by weight of 1,3,5-triallyl-[1,3,5]triazinane-2,4,6-trione (Aldrich) as a dopant, and 54% by weight of 4'-octyl-biphenyl-4-carbonitrile (Aldrich) and 40% by weight of 4'-octyloxy-biphenyl-4-carbonitrile as smectic liquid crystal molecules were injected between the substrates at 70° C. to fabricate a liquid crystal device.

Example 6

A liquid crystal device was fabricated in the same manner as in Example 1, except that 4'-nonyl-biphenyl-4-carbonitrile (Aldrich) was used as smectic liquid crystal molecules.

Example 7

A liquid crystal device was fabricated in the same manner as in Example 1, except that 4'-dodecyl-biphenyl-4-carbonitrile (Aldrich) was used as smectic liquid crystal molecules.

Comparative Example 1

Upper and lower glass substrates on which transparent electrodes (ITO electrodes) were deposited were coated with an aligner (polyimide solution), heat-cured, and laminated to each other so that the rubbing direction of the upper glass substrate was opposite to that of the lower glass substrate. The interval between the substrates was adjusted to 5.32 μm using a ceramic spacer. Next, 2.5% by weight of 1,3,5-triallyl-[1,3,5]triazinane-2,4,6-trione (Aldrich) as a dopant and 97.5% by weight of 4'-octyl-biphenyl-4-carbonitrile (Aldrich) as smectic liquid crystal molecules were injected between the substrates to fabricate a liquid crystal device.

Comparative Example 2

A liquid crystal device was fabricated in the same manner as in Comparative Example 1, except that 10% by weight of the dopant was used and 90% by weight of 4'-dodecyl-biphenyl-4-carbonitrile (Aldrich) was used as smectic liquid crystal molecules.

Comparative Example 3

A liquid crystal device was fabricated in the same manner as in Comparative Example 1, except that 5% by weight of 1,3,5-tris-(2-hydroxyethyl)-[1,3,5]triazinane-2,4,6-trione (Aldrich) having two carbon atoms in the N-bonding moiety (X) was used as a dopant and 95% by weight of 4'-octyl-biphenyl-4-carbonitrile (Aldrich) was used as smectic liquid crystal molecule.

Comparative Example 4

A liquid crystal device was fabricated in the same manner as in Example 1, except that 95% by weight of 4'-pentyl-biphenyl-4-carbonitrile (Aldrich) as smectic liquid crystal molecules.

Comparative Example 5

A liquid crystal device was fabricated in the same manner as in Example 1, except that no dopant was used and 100% by weight of 4'-octyl-biphenyl-4-carbonitrile (Aldrich) was used as smectic liquid crystal molecules.

Comparative Example 6

A liquid crystal device was fabricated in the same manner as in Comparative Example 4, except that no dopant was used and 100% by weight of 4'-pentyl-biphenyl-4-carbonitrile (Aldrich) was used as smectic liquid crystal molecules.

Example 8

A liquid crystal device was fabricated in the same manner as in Example 1, except that ITO-deposited plastic substrates (PES, Poly-ether-sulfone, thickness: 120 µm) were used, and treatment with an aligner was not performed.

Example 9

A liquid crystal device was fabricated in the same manner as in Example 1, except that a patterned substrate on which ITO electrodes were spaced at an interval of 15 µm and a general glass substrate were used, and the glass substrate was spin-coated with a vertical alignment agent (produced by JSR Nippon, JALS series) and heated to 180° C. for 2 hours without rubbing.

Test Example 1

Response Speed and Contrast Ratio Test

Figure 3:
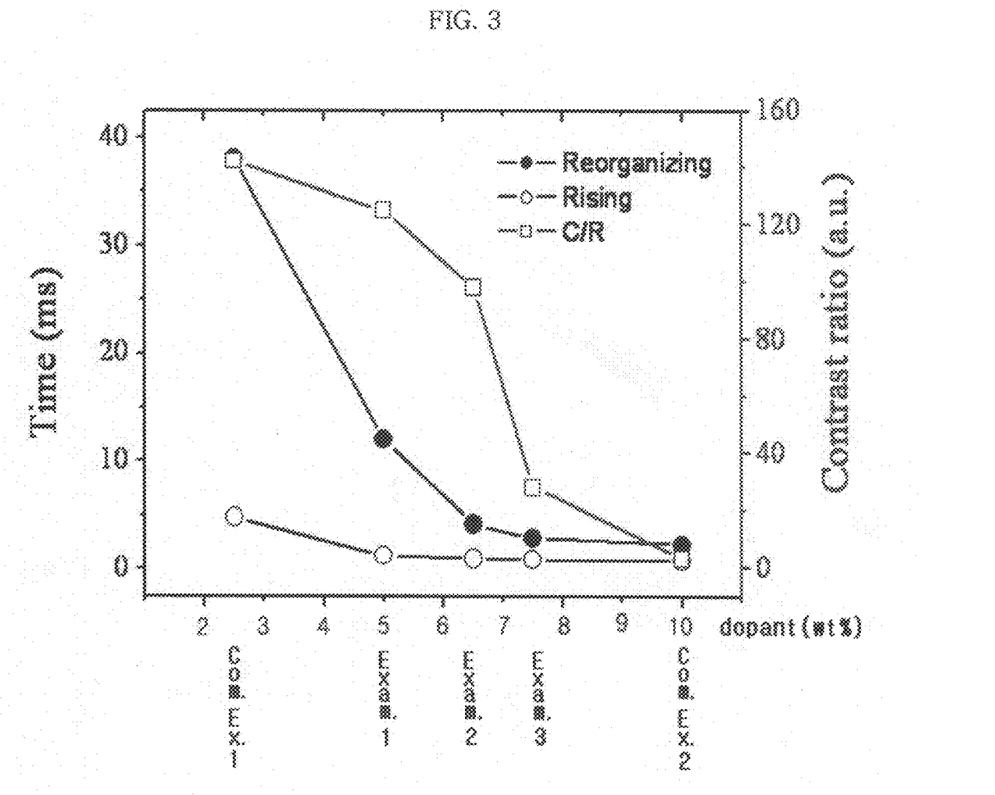
FIG. 3 is a graph showing the response speed (rising time and reorganizing time) and contrast ratio of liquid crystal devices fabricated in Examples 1 to 3 and Comparative Examples 1 and 2 of the present invention.

FIG. 3 is a graph showing the response speed (rising time and reorganizing time) and contrast ratio of the liquid crystal devices fabricated in Examples 1 to 3 and Comparative Examples 1 and 2. The evaluation of the response speed was conducted by measuring the time the transmittance reached 90% from 10% when a square wave was applied to each of the liquid crystal devices using a waveform generator while a laser beam at 633 nm was transmitted through the device disposed between vertical polarizers. Referring to the graph of FIG. 3, the liquid crystal device fabricated in Comparative Example 1 has a reorganizing time of as slow as about 37 ms, whereas the liquid crystal devices fabricated in Examples 1 to 3 have a reorganizing time of less than 13 ms. Taking into consideration the fact that the highest response speed of currently available LCDs is about 16 ms, the response time of the liquid crystal devices fabricated in Examples 1 to 3 is considerably fast. The liquid crystal devices fabricated in Examples 1 to 3 according to the present invention were measured to have satisfactory contrast ratios of 30:1 or higher. Specifically, the liquid crystal device of Example 2 had a rising time not more than 1 ms, a reorganizing time of 3.4 ms and a high contrast ratio of about 100:1.

Test Example 2

Identification of Structure of Liquid Crystal Assembly

Figure 4:
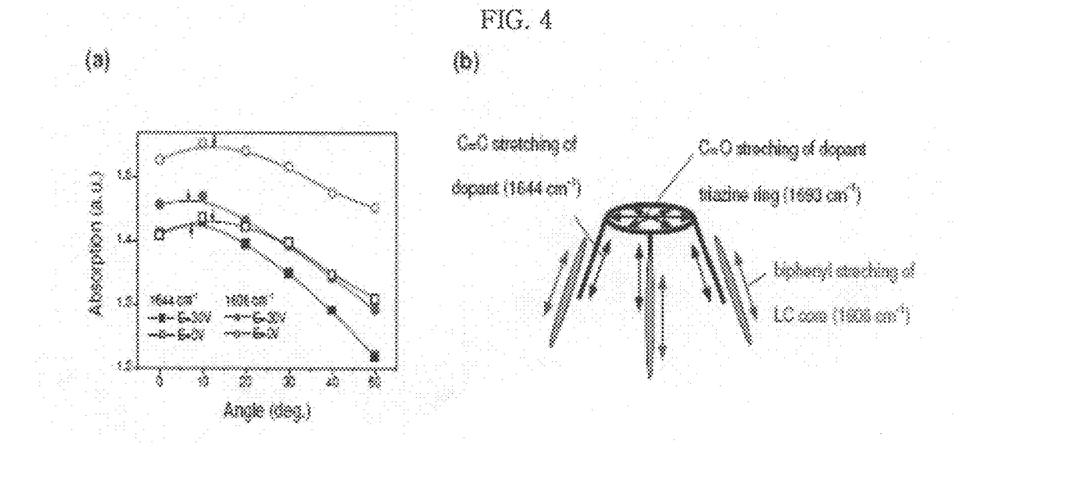
FIG. 4a is a graph showing changes in the absorption of a liquid crystal device fabricated in Example 1 of the present invention when the device is irradiated with infrared rays at various angles.
FIG. 4b shows the alignment state a dopant and liquid crystal molecules used in a liquid crystal device fabricated in Example 1.
Figure 5:
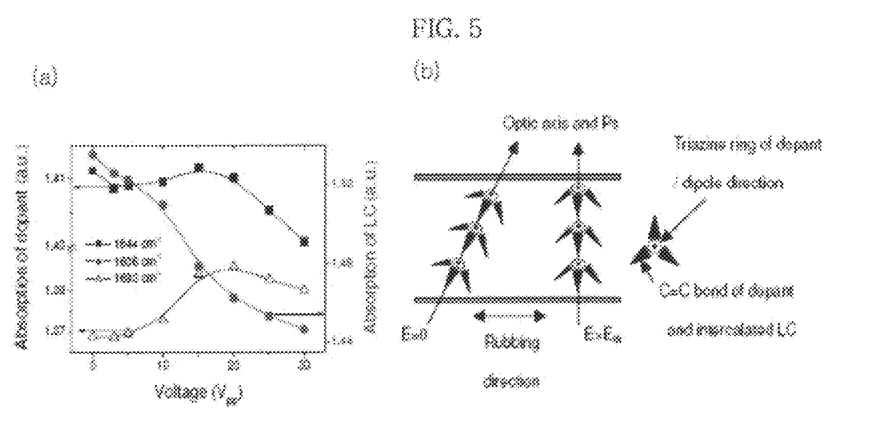
FIG. 5a is a graph showing changes in the absorption of a liquid crystal device fabricated in Example 1 of the present invention when the device is irradiated with IR in a direction normal to the surface of the device.
FIG. 5b shows the alignment state a dopant and liquid crystal molecules used in a liquid crystal device fabricated in Example 1 when an electric field is applied to the device.

To identify that the polar nematic liquid crystal assembly of the present invention has the structure shown in FIG. 1, ITO-deposited $CaF_2$ plates were treated with an aligner, and then the nematic liquid crystal assembly used in Example 1 was used to fabricate a liquid crystal device. Next, the liquid crystal device was positioned within an FT-IR spectrometer (manufactured by Bio-Rad, FTS-7000) to test the IR absorption. The results are shown in FIGS. 4a and 5a. As can be seen from the graph shown in FIG. 4a, an absorption peak (1,606 $cm^{-1}$) due to biphenyl stretching, which is regarded as the long axial direction of the liquid crystal molecules, and an absorption peak (1,644 $cm^{-1}$) due to C=C stretching of the dopant in a state where no electric field was applied (ground state) equally show maximum absorption at an incident angle of 15°. In addition, absorption of each band in the saturation field state equally shows the maximum value at an angle of about 5°. The absorption peak of the biphenyl stretching of the liquid crystal molecules matches coincidence with the maximum value of the absorption peak of C=C stretching of the dopant in both the ground state and the saturation field state, which indicates that the core of the liquid crystal molecules is intercalated in parallel with the C=C bonds of the dopant, as shown in FIG. 4b. The observation that the maximum absorption takes place at angles of 15° and 5° in the ground state and the saturation field state, respectively, represents that symmetry axes of the liquid crystal molecules intercalated into the tripod shape of the dopant have angles of 15° and 5° from the surface normal direction.

On the other hand, after IR was normally incident on the surface of the device, changes in absorption intensity of the device in the ground state and the saturation field state were observed. The results are shown in FIG. 5a. Referring to the graph of FIG. 5a, the C=C stretching peak (1,644 $cm^{-1}$) of the dopant molecule and the biphenyl stretching peak (1,606 $cm^{-1}$) in the long axial direction of the liquid crystal molecules have lower absorption intensity values in the saturation field state than in the ground state. However, the stretching peak (1693 $cm^{-1}$) of the C=O bond in the same plane as the triazine ring of the dopant molecule has higher absorption intensity values in the saturation field state than in the ground state. In the case where IR is incident on the device in a direction normal to the surface of the device, the polarized light vibrates parallel to the surface. Accordingly, the increased IR absorption intensity demonstrates that the vibration bonds are aligned parallel to the surface. In conclusion, these experimental results indicate that when a sufficient electric field is applied, the triazine ring of the dopant molecule is aligned in a direction parallel to the surface and the long axis of the liquid crystal molecules is aligned in a direction perpendicular to the surface, as shown in FIG. 5b.

Test Example 3

Identification of Ferroelectricity

Figure 6:
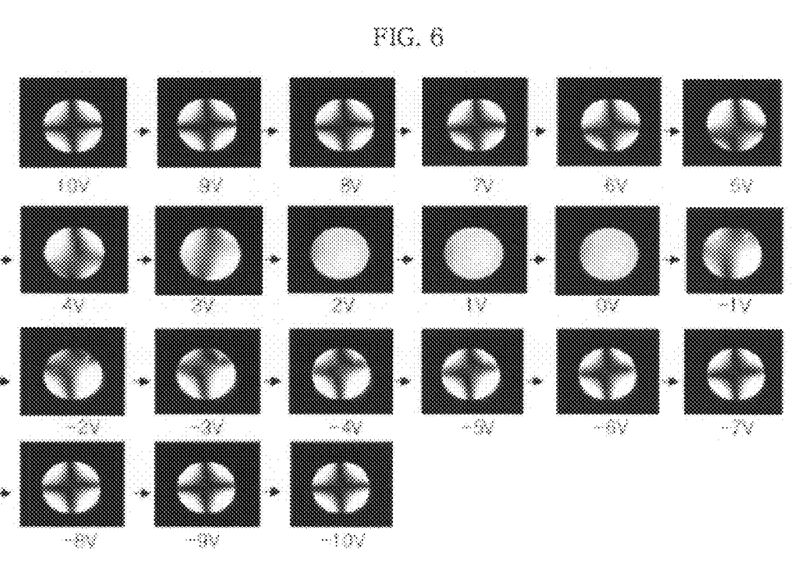
FIG. 6 shows conoscopic images of a liquid crystal device fabricated in Example 1 of the present invention according to the magnitude of voltage when a DC electric field is applied to the device.
Figure 7:
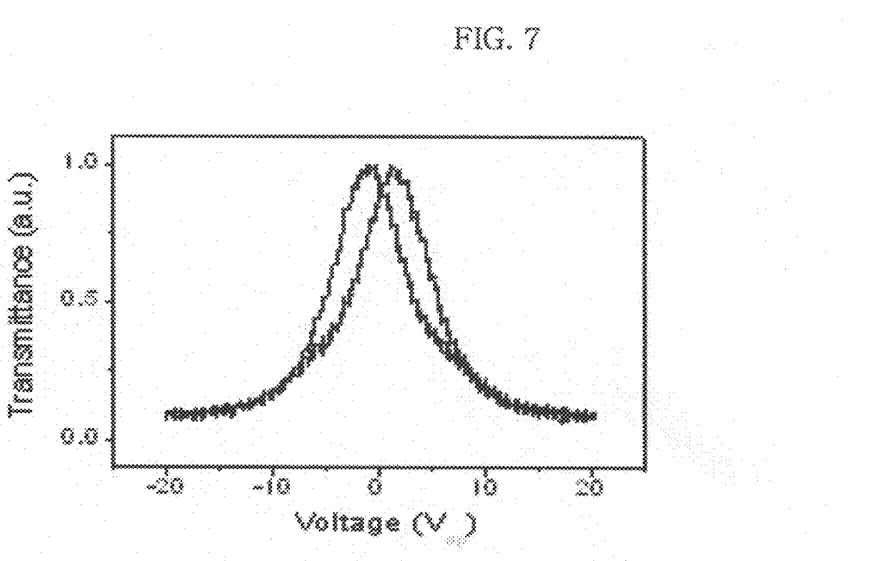
FIG. 7 is a graph showing changes in the transmittance of a liquid crystal device fabricated in Example 1 of the present invention when a triangular wave is applied to the device.
Figure 8:
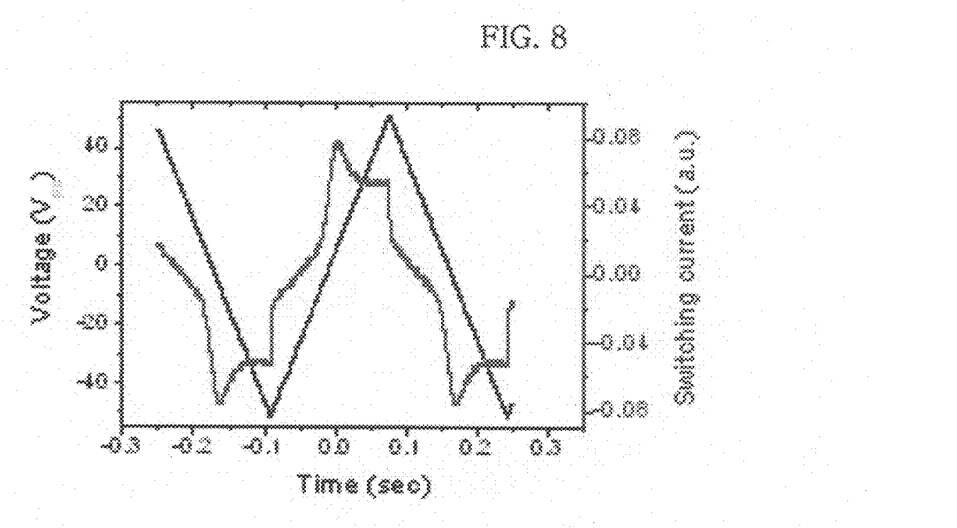
FIG. 8 is a graph showing changes in the switching current flowing in a liquid crystal device fabricated in Example 1 of the present invention in a state where a triangular wave is applied to the device.

FIG. 6 shows conoscopic images of the liquid crystal device fabricated in Example 1, as taken using a Nickon polarizing microscope (ECLIPSE E600W POL), according to the magnitude of voltage when a DC electric field was applied to the device. Conoscopy is a widely known optical experimental technique by which the position of the optic axis of a material can be determined. After the liquid crystal device fabricated in Example 1 was disposed between vertical polarizers and irradiated with light at various angles, a crisscross pattern was observed. The central point (i.e. intersecting point) of the crisscross pattern is a position of the optic axis where refractive index anisotropy is the same with respect to all incident angles. Referring to the images shown in FIG. 6, when the direction of the electric field is changed (+→−), the intersecting point of the crisscross pattern (i.e. the position of the optic axis) moves. This observation represents that the liquid crystal device of the present invention is a polar one whose alignment state varies depending on the direction of the electric field. In addition, FIG. 7 is a graph showing changes in the transmittance of the liquid crystal device fabricated in Example 1 when a triangular wave was applied to the device. From the graph shown in FIG. 7, it could be confirmed that the liquid crystal device exhibits hysteresis, which is a characteristic inherent to polar devices. On the other hand, FIG. 8 is a graph showing changes in the switching current flowing in the liquid crystal device fabricated in Example 1 in a state where a triangular wave was applied to the device. Referring to the graph of FIG. 8, a current peak indicating the induction of spontaneous polarization is observed, which is a characteristic inherent to polar devices. As is evident from the results of FIGS. 6 to 8, the liquid crystal device of the present invention is electrically polar. Accordingly, the polar nematic liquid crystal device of the present invention advantageously has the same response speed in both directions, unlike conventional apolar nematic liquid crystal devices.

Test Example 4

Identification of Nematic Properties

Figure 9:
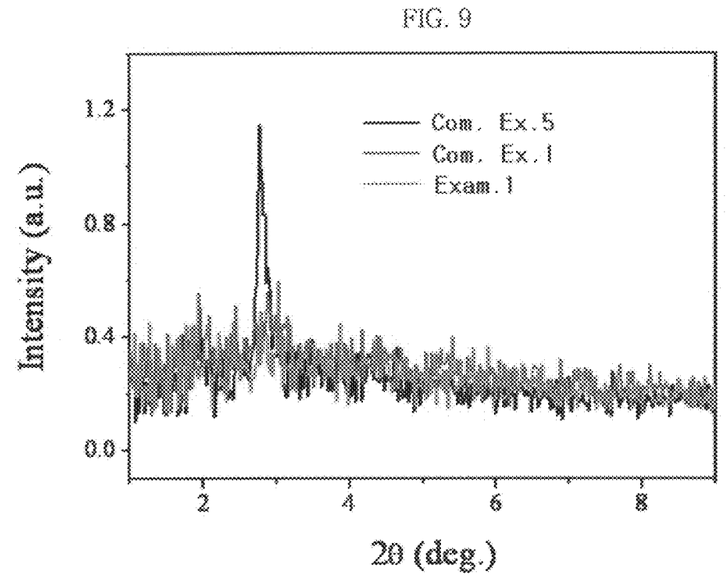
FIG. 9 is a graph showing the results of X-ray scattering experiments on liquid crystal devices fabricated in Example 1 and Comparative Examples 1 and 5 of the present invention.

FIG. 9 is a graph showing the results of X-ray scattering experiments on the liquid crystal devices fabricated in Example 1 and Comparative Examples 1 and 5. As can be seen from the graph shown in FIG. 9, a sharp peak is observed in the liquid crystal device containing no dopant (Comparative Example 5), whereas the peak disappears in the liquid crystal devices (Example 1 and Comparative Example 1) containing the dopant. As is evident from the graph shown in FIG. 9, the liquid crystal device of the present invention is in a nematic phase having no positional ordering, and is highly stable against impact in view of potent fluid characteristics of the nematic phase.

Test Example 5

Identification of Cholesteric Properties

Figure 10:
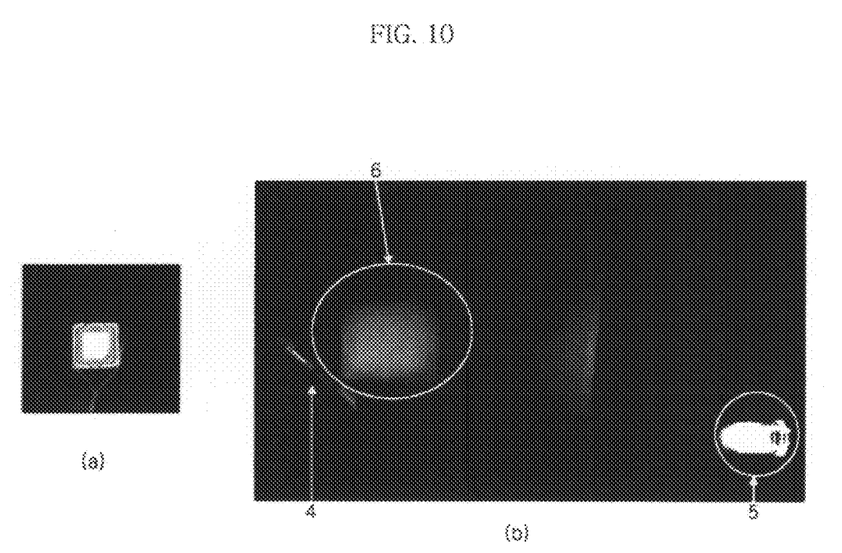
FIGS. 10a and 10b are photographs showing the transmissive and reflective states of a liquid crystal device fabricated in Example 1 of the present invention when irradiated with white light using a white LED in a state where no electric field is applied to the device, respectively.

While the liquid crystal device fabricated in Example 1 was irradiated with light using a white LED in a state where no electric field is applied to the device, the color of the liquid crystal device in a transmissive state and the reflected light from the device in a reflective state were observed. The results are shown in FIGS. 10a and 10b. As a result, the color of the liquid crystal device is yellow in the transmissive state as shown (see, FIG. 10a) and the reflected light from the device is blue (see, FIG. 10b), which indicates that the liquid crystal molecules selectively reflect light of particular wavelengths because they have a helical structure. That is, the liquid crystal mixture is in a cholesteric phase having a helical structure in the state where no electric field was applied. Since the liquid crystal device of the present invention thus fabricated finally exhibits a cholesteric phase despite the use of achiral liquid crystal molecules, the fabrication costs can be markedly reduced and the problem of low response speed encountered with conventional cholesteric liquid crystal devices can be solved. Accordingly, the use of the liquid crystal device according to the present invention enables realization of full colors without using color filters and achievement of high response speed.

Test Example 6

Identification of Grayscale Characteristics

Figure 11:
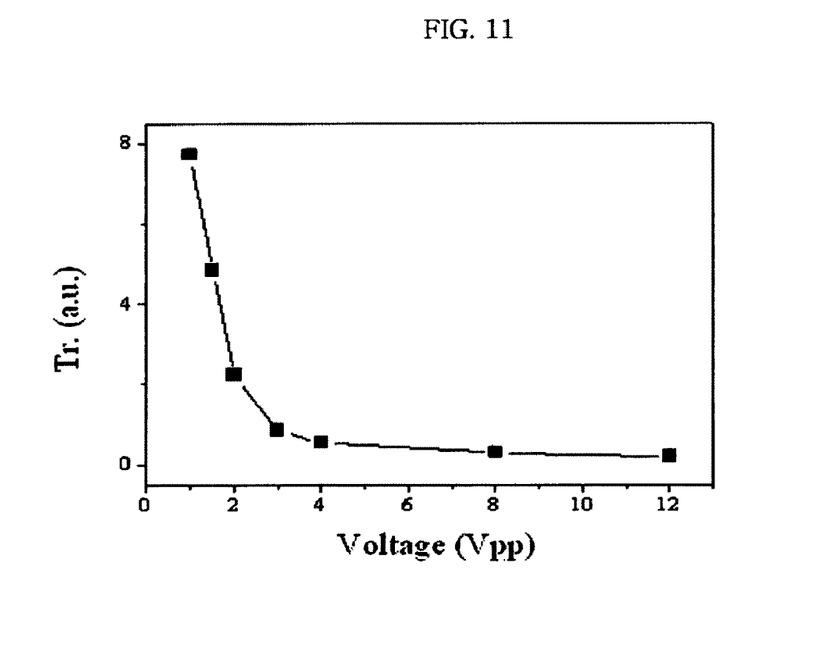
FIG. 11 is a graph showing changes in the transmittance of a liquid crystal device fabricated in Example 1 of the present invention according to the changes in the voltage applied to the device.
Figure 12:
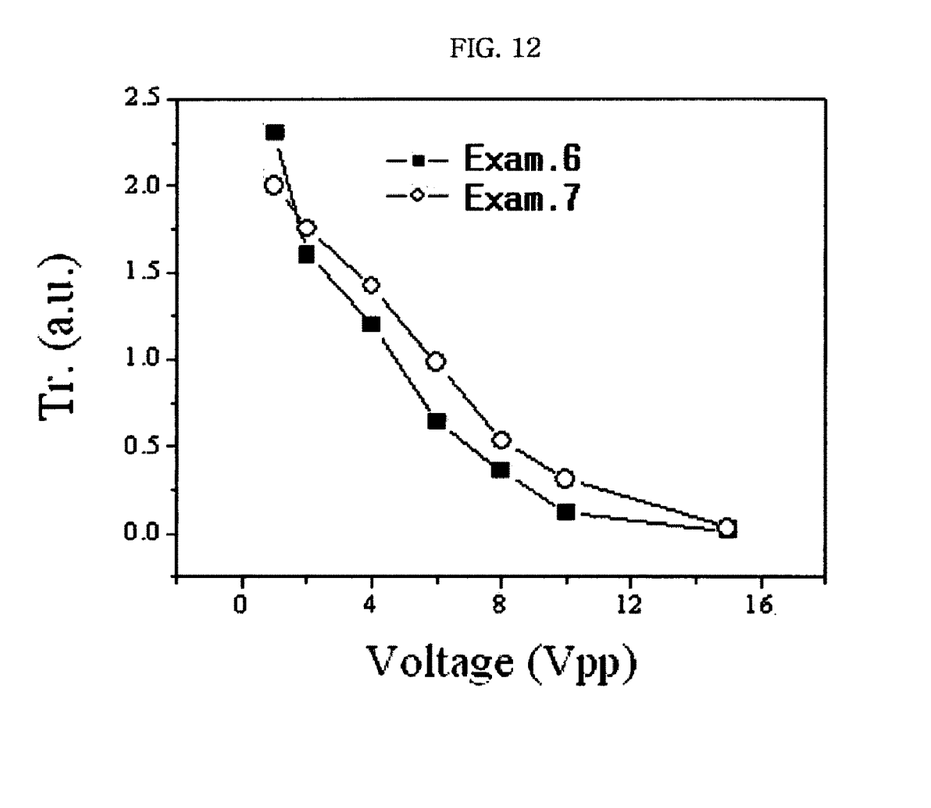
FIG. 12 is a graph showing changes in the transmittance of liquid crystal devices fabricated in Examples 6 and 7 of the present invention according to the changes in the voltage applied to the devices.

FIG. 11 is a graph showing changes in the transmittance (Tr) of the liquid crystal device fabricated in Example 1 according to the changes in the voltage applied to the device. As an electric field was applied, the liquid crystal assembly lost its helical structure and was finally aligned in a direction parallel to the electric field. During the alignment, optical anisotropy of the device on light was changed, leading to changes in transmittance. On the other hand, FIG. 12 is a graph showing changes in the transmittance (Tr) of the liquid crystal devices fabricated in Examples 6 and 7 according to the changes in the voltage applied to the devices. Since the transmittance of the devices was varied depending on the voltages of an applied electric field, as in the device fabricated in Example 1, the liquid crystal assembly was confirmed to exhibit polarity. Accordingly, the use of the liquid crystal device according to the present invention enables realization of analogue grayscale.

Test Example 7

Determination of Stability Against Impact

Figure 13:
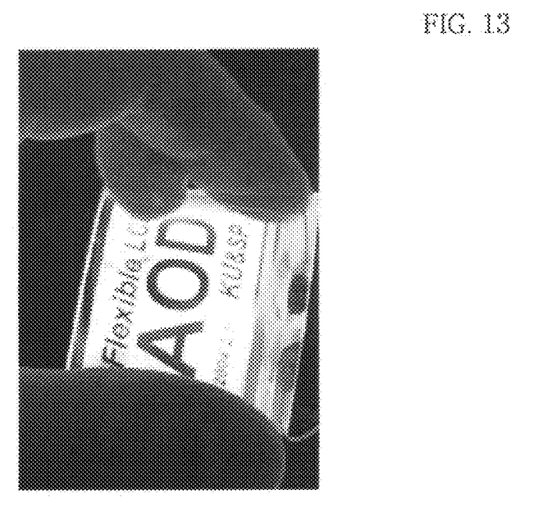
FIG. 13 is a photograph demonstrating the alignment and stability against bending of a liquid crystal device fabricated in Example 8 of the present invention.

FIG. 13 is a photograph demonstrating the alignment and stability against bending of the liquid crystal device fabricated in Example 8. As can be confirmed from the photograph of FIG. 13, the device has a high contrast ratio of about 100:1 and superior stability against impact. Therefore, since the device has superior stability against impact to conventional ferroelectric liquid crystal devices, the device can be applied to flexible displays using plastic substrates.

Test Example 8

Response Speed and Transmittance Test

Figure 14:
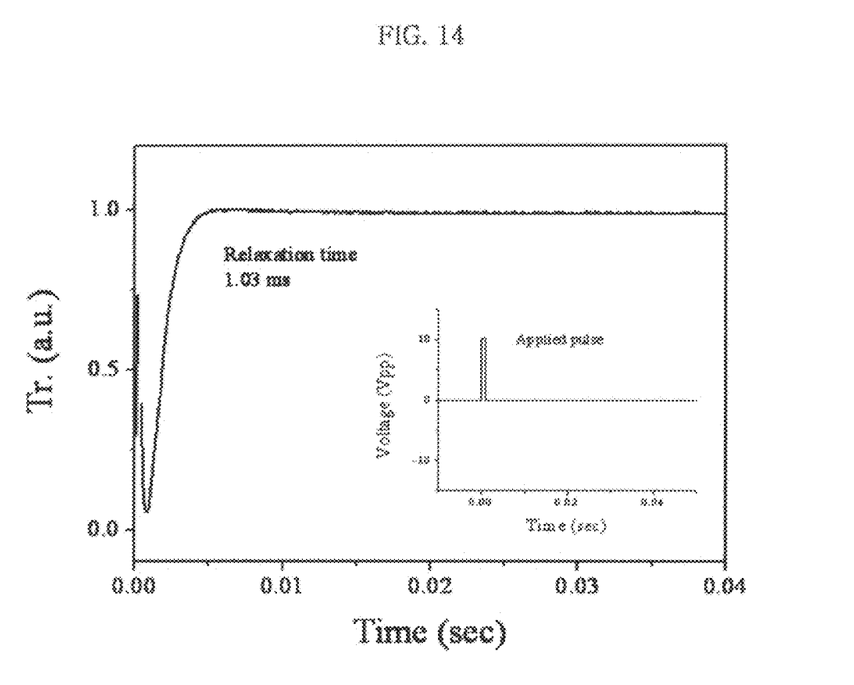
FIG. 14 is a graph showing the response speed (rising time and reorganizing time) of a liquid crystal device fabricated in Example 4 of the present invention.
Figure 15:
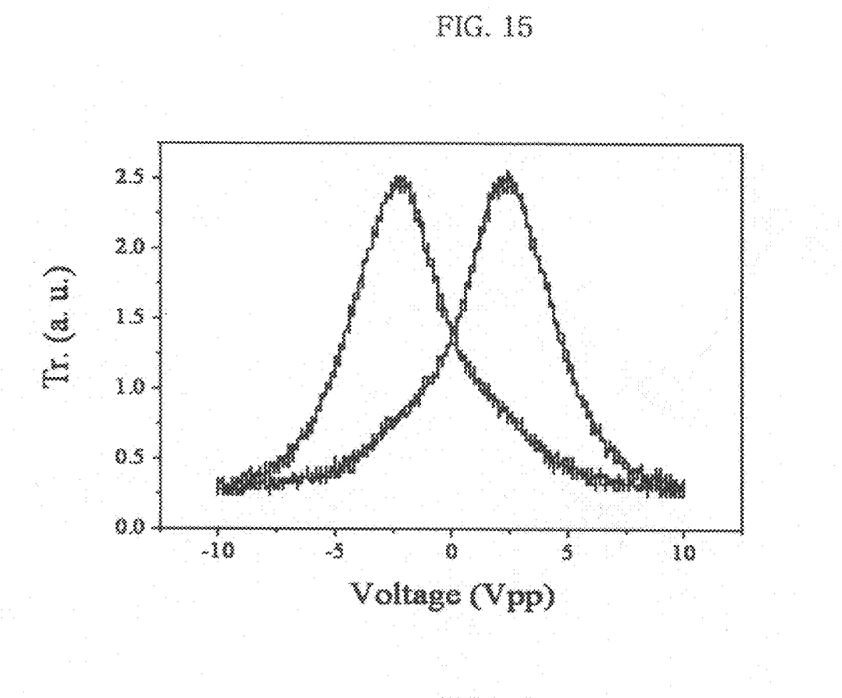
FIG. 15 is a graph showing changes in the transmittance of a liquid crystal device fabricated in Example 5 of the present invention when a triangular wave is applied to the device.
Figure 16:
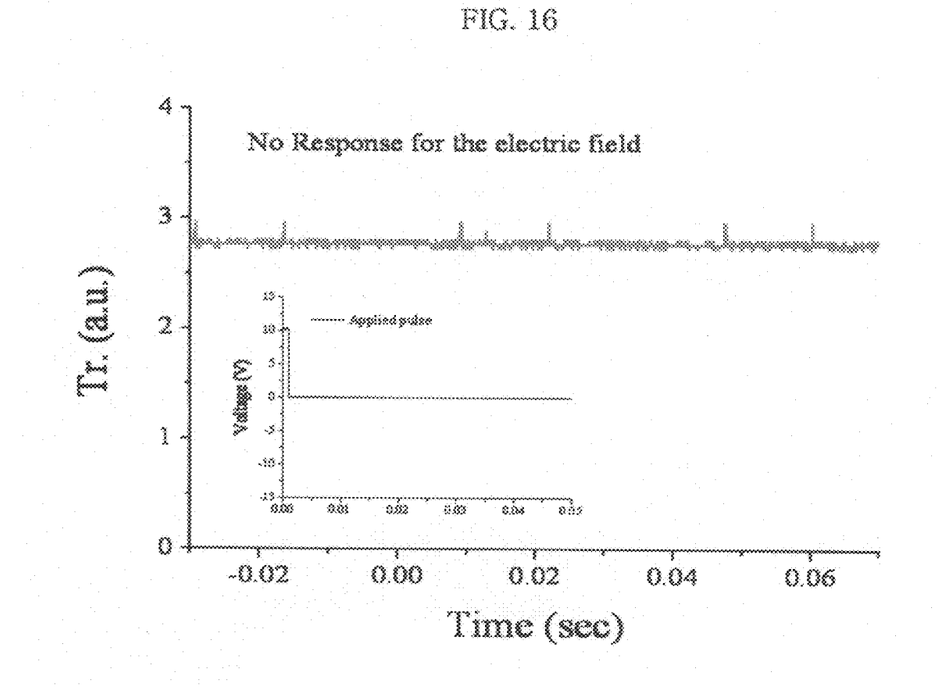
FIG. 16 is a graph showing changes in the transmittance of a liquid crystal device fabricated in Comparative Example 3 of the present invention when an electric field is applied to the device.

FIG. 14 is a graph showing the response speed (rising time and reorganizing time) of the liquid crystal device fabricated in Example 4, and FIG. 15 is a graph showing changes in the transmittance of the liquid crystal device fabricated in Example 5 when a triangular wave was applied to the device. Referring to the graph of FIG. 14, the liquid crystal device fabricated in Example 4 using 1,3,5-tris-oxyranylmethyl-[1,3,5]triazinane-2,4,6-trione as a dopant has a reorganizing time of 1.03 ms, which is higher than that (3.4 ms) of the liquid crystal device fabricated in Example 1. As can be seen from the graph of FIG. 15, the liquid crystal device fabricated in Example 5 using 1,3,5-triallyl-[1,3,5]triazinane-2,4,6-trione as a dopant and 4'-octyl-biphenyl-4-carbonitrile and 4'-octyloxy-biphenyl-4-carbonitrile as liquid crystal molecules exhibits hysteresis and shows operational characteristics of a polar nematic liquid crystal device. In contrast, FIG. 16 is a graph showing changes in the transmittance of the liquid crystal device fabricated in Comparative Example 3. It is apparent from the graph of FIG. 16 that the liquid crystal device hardly responds to an applied electric field. Therefore, the liquid crystal device of Comparative Example 3 exhibits no polarity.

Test Example 9

Determination of Superior Alignment

Figure 17:
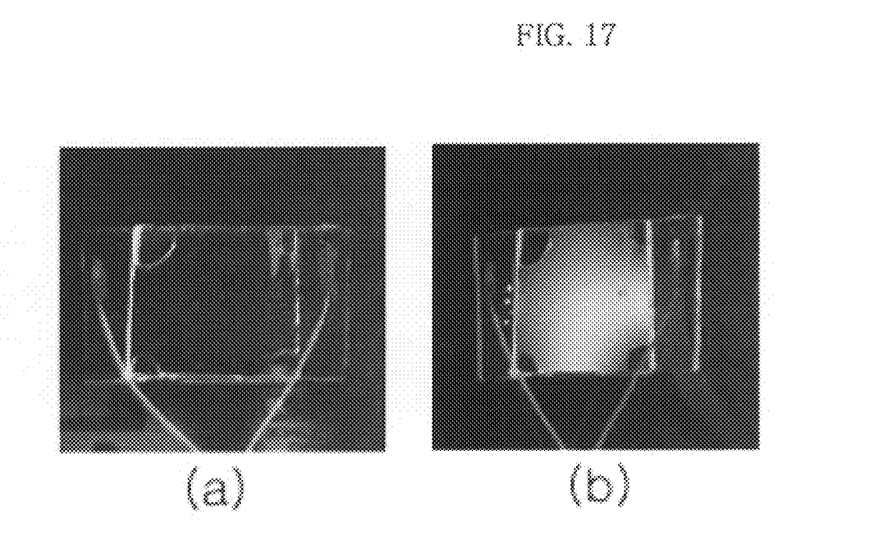
FIGS. 17a and 17b are photographs showing the transmissive states of a liquid crystal device fabricated in Example 8 of the present invention when light is incident in directions perpendicular and inclined to the device, respectively.
Figure 18:
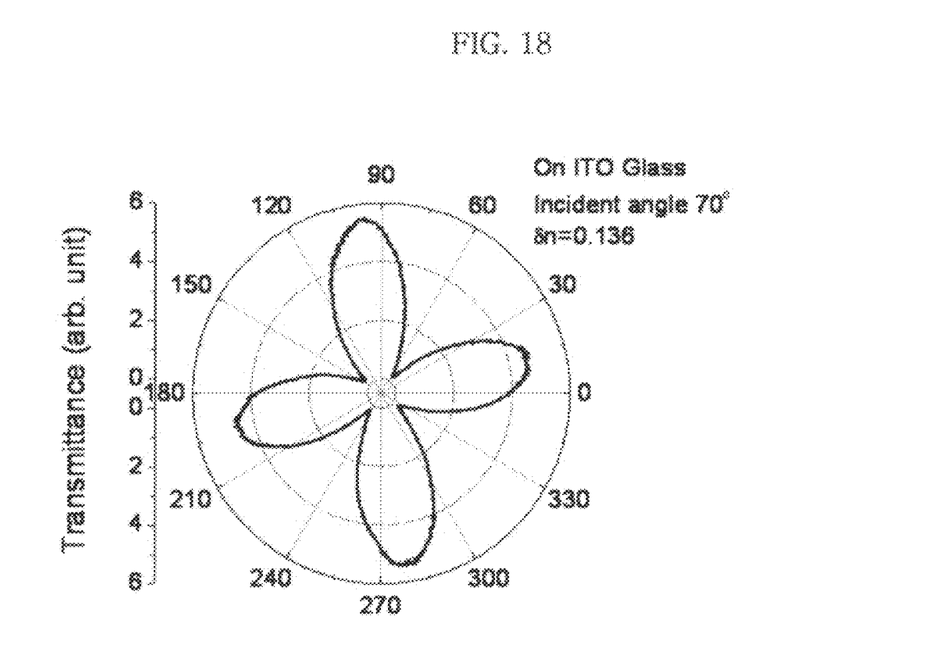
FIG. 18 is a graph showing the measurement results of the optical anisotropy (birefringence) of a liquid crystal device fabricated in Example 8 of the present invention when light is incident on the device at an angle of 70°.

FIGS. 17a and 17b are photographs showing the transmissive states of the liquid crystal device fabricated in Example 8 when light was incident in directions perpendicular and inclined to the device, respectively. The light incident perpendicularly to the liquid crystal device positioned between polarizers arranged vertically to each other does not transmit through the device (see, FIG. 17a), while the incident light inclined to the liquid crystal device transmits through the device (see, FIG. 17b). These observations demonstrate that the liquid crystal assembly used in the device is aligned along an optic axis perpendicular to the substrates without using an aligner. On the other hand, FIG. 18 is a graph showing the measurement results of the optical anisotropy (birefringence) of the liquid crystal device fabricated in Example 8 when light was incident on the device at an angle of 70°. The liquid crystal device was measured to have a birefringence of 0.136, which indicates that the liquid crystal device fabricated without additional treatment with an aligner has optical anisotropy comparable to that of conventional liquid crystal devices fabricated by treating with aligners.

Test Example 10

Test for Characteristics of IPS-Type Device

Figure 19:
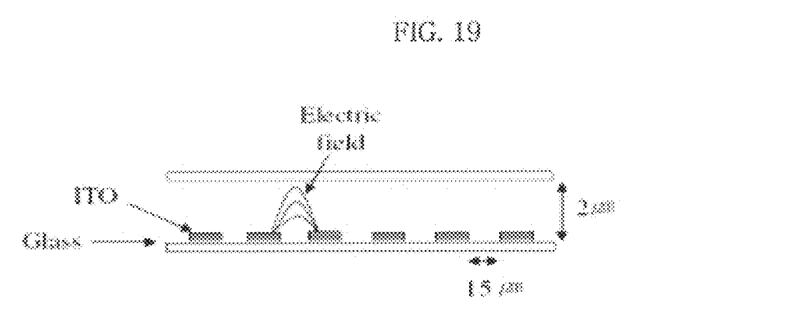
FIG. 19 is a schematic view showing the structure of a liquid crystal device fabricated in Example 9 of the present invention.
Figure 20:
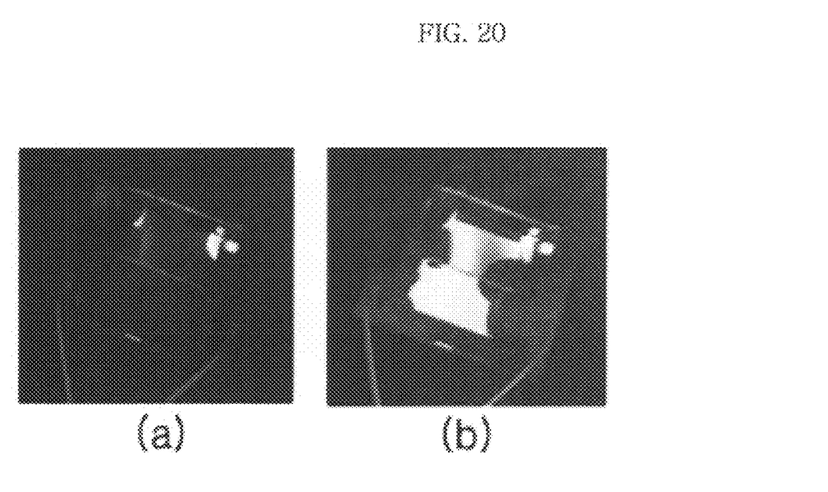
FIGS. 20a and 20b are photographs showing the states of a liquid crystal device fabricated in Example 9 of the present invention when an electric field is not applied and is applied to the device, respectively.

The liquid crystal device fabricated in Example 9 is schematically shown in FIG. 19. Photographs showing the states of the device when an electric field was not applied and was applied are shown in FIGS. 20a and 20b, respectively. As shown in FIGS. 20a and 20b, the optic axis of the liquid crystal device is aligned perpendicularly to the substrates when no electric field is applied (FIG. 20a), and is aligned parallel to the surface of the substrates when an electric field is applied, allowing light to be transmitted through the device. That is, uniform alignment of the liquid crystal device according to the present invention can be achieved by electrode deposition without additional treatment with an aligner, contributing to marked reduction in fabrication costs and increase in transmittance and color purity as compared to conventional liquid crystal devices fabricated by treating with aligners.

Test Example 11

Figure 21:
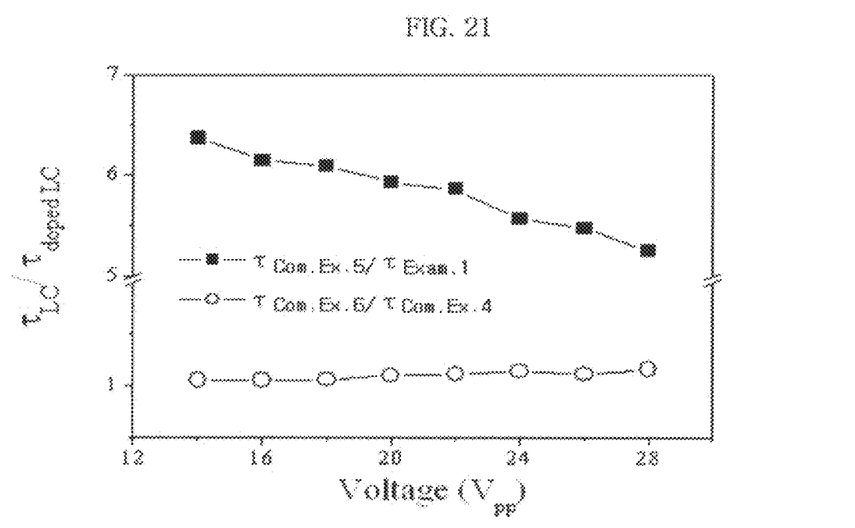
FIG. 21 is a graph showing changes in the ratio ($\tau_{LC}/\tau_{doped\ LC}$) between the response speed of a liquid crystal device fabricated in Example 1 and that of a liquid crystal device fabricated in Comparative Example 5 of the present invention when an electric field is applied to the devices, and changes in the ratio ($\tau_{LC}/\tau_{doped\ LC}$) between the response speed of a liquid crystal device fabricated in Comparative Example 4 and that of a liquid crystal device fabricated in Comparative Example 6 of the present invention when an electric field is applied to the devices.

Changes in the ratio ($\tau_{LC}/\tau_{doped\,LC}$) between the response speed of the liquid crystal device fabricated in Example 1 and that of the liquid crystal device fabricated without using a dopant in Comparative Example 5 were measured at various voltages of an applied electric field. In addition, changes in the ratio ($\tau_{LC}/\tau_{doped\,LC}$) between the response speed of the liquid crystal device fabricated in Comparative Example 4 and that of the liquid crystal device fabricated without using a dopant in Comparative Example 6 were measured at various voltages of an applied electric field. The obtained results are shown in FIG. 21. As can be seen from the graph of FIG. 21, the liquid crystal devices fabricated using the liquid crystal molecules having a $C_5$ alkyl chain show the same response time before and after the use of the dopant. That is, the response speed ratio of the liquid crystal devices was maintained at a constant level, irrespective of the intensity of the electric field. In contrast, the liquid crystal devices fabricated using the liquid crystal molecules having a $C_8$ alkyl chain show a much faster response time due to the use of the dopant. That is, the liquid crystal devices fabricated using the liquid crystal molecules having a $C_5$ alkyl chain exhibit no polarity.

INDUSTRIAL APPLICABILITY

As apparent from the above description, since the polar nematic liquid crystal device of the present invention is electrically polar, it shows the same speed in both directions by varying the direction of an applied electric field and thus has a much higher response speed than conventional liquid crystal devices. Accordingly, the use of the polar nematic liquid crystal device according to the present invention enables manufacture of an LCD product having a much higher response speed than currently available LCD products, and can thus solve the problem of afterimages caused upon high-speed imaging, which has been encountered in the sue of conventional LCDs. In addition, since the liquid crystal device of the present invention exhibits a nematic phase in the ordering of liquid crystal molecules, it has superior stability against impact to conventional ferroelectric liquid crystal devices and thus can be applied to flexible displays using plastic substrates. Furthermore, since the liquid crystal device of the present invention has a much higher response speed than conventional cholesteric phase liquid crystal devices, it enables realization of full colors without using color filters. Moreover, since the liquid crystal device of the present invention has superior alignment characteristics without additional treatment with an aligner, side effects, e.g., deterioration in transmittance and color purity and occurrence of defects, of the aligner treatment can be prevented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:
1. A polar nematic liquid crystal assembly, comprising:
5~7.5% by weight of a dopant having the structure of Formula 1 below:

(1)

(wherein X is an alkyl, alkenyl or heteroalkyl group having three or more carbon atoms); and
92.5·95% by weight of smectic liquid crystal molecules having a linear alkyl chain,
wherein the N-bonding moiety of the dopant is spontaneously bonded to the alkyl chain of the smectic liquid crystal molecules to induce macroscopic spontaneous polarization in a particular direction, wherein the spontaneous bonding is physical bonding caused by intermolecular interaction.

2. The liquid crystal assembly according to claim 1, wherein the dopant is 1,3,5-triallyl-[1,3,5]triazinane-2,4,6-trione or 1,3,5-tris-oxiraylmethyl-[1,3,5]triazinane-,4,6-trione.

3. The liquid crystal assembly according to claim 1, wherein the alkyl chain of the smectic liquid crystal molecules has eight or more carbon atoms.

4. The liquid crystal assembly according to claim 1, wherein the smectic liquid crystal compound is selected from the group consisting of 4'-octyl-biphenyl-4-carbonitrile, 4'-nonyl-biphenyl-4-carbonitrile, 4'-decyl-biphenyl-4-carbonitrile, 4'-undecyl-biphenyl-4-carbonitrile, 4'-dodecyl-biphenyl-4-carbonitrile, 4'-octyloxy-biphenyl-4-carbonitrile, 4'-nonyloxy-biphenyl-4-carbonitrile, 4'-decyloxy-biphenyl-4-carbonitrile, 4'-undecyloxy-biphenyl-4-carbonitrile, 4'-dodecyloxy-biphenyl-4-carbonitrile, and mixtures thereof.

5. The liquid crystal assembly according to claim 1, wherein the liquid crystal assembly has cholesteric properties in a state where no electric field is applied thereto.

6. A polar nematic liquid crystal device, comprising:
the liquid crystal assembly according to claim 1;
electrodes for applying a voltage to the liquid crystal assembly; and
a pair of substrates facing each other.

7. The liquid crystal device according to claim 6, wherein the polar nematic liquid crystal assembly is operated in opposite directions depending on the intensity of an electric field.

8. The liquid crystal device according to claim 6, wherein analogue grayscale is realized depending on the direction of an electric field.

9. The liquid crystal device according to claim 6, wherein the polar nematic liquid crystal device is of an in-plane switching (IPS) type in which patterned electrodes are formed on the surface of one of the pair of substrates facing each other, and the optic axis of the liquid crystal assembly is aligned perpendicularly to the substrates when no electric field is removed and is aligned parallel to the surface of the substrates when an electric field is applied.

10. The liquid crystal device according to claim 9, wherein the substrates are made of glass or plastic, and the electrodes are transparent ITO electrodes.

* * * * *

UNITED STATES PATENT AND TRADEMARK OFFICE
CERTIFICATE OF CORRECTION

PATENT NO. : 7,935,394 B2  Page 1 of 1
APPLICATION NO. : 11/885060
DATED : May 3, 2011
INVENTOR(S) : Tong-Kun Lim et al.

It is certified that error appears in the above-identified patent and that said Letters Patent is hereby corrected as shown below:

In the Claims

Column 14, Claim 1, line 62    Delete "92.53·95%"
                                Insert -- 92.5~95% --

Signed and Sealed this
Twenty-fourth Day of April, 2012

David J. Kappos
*Director of the United States Patent and Trademark Office*